M. GARVEY.
APPARATUS FOR TESTING DRILL HOLES.
APPLICATION FILED APR. 23, 1909.
965,808.
Patented July 26, 1910.
3 SHEETS—SHEET 1.
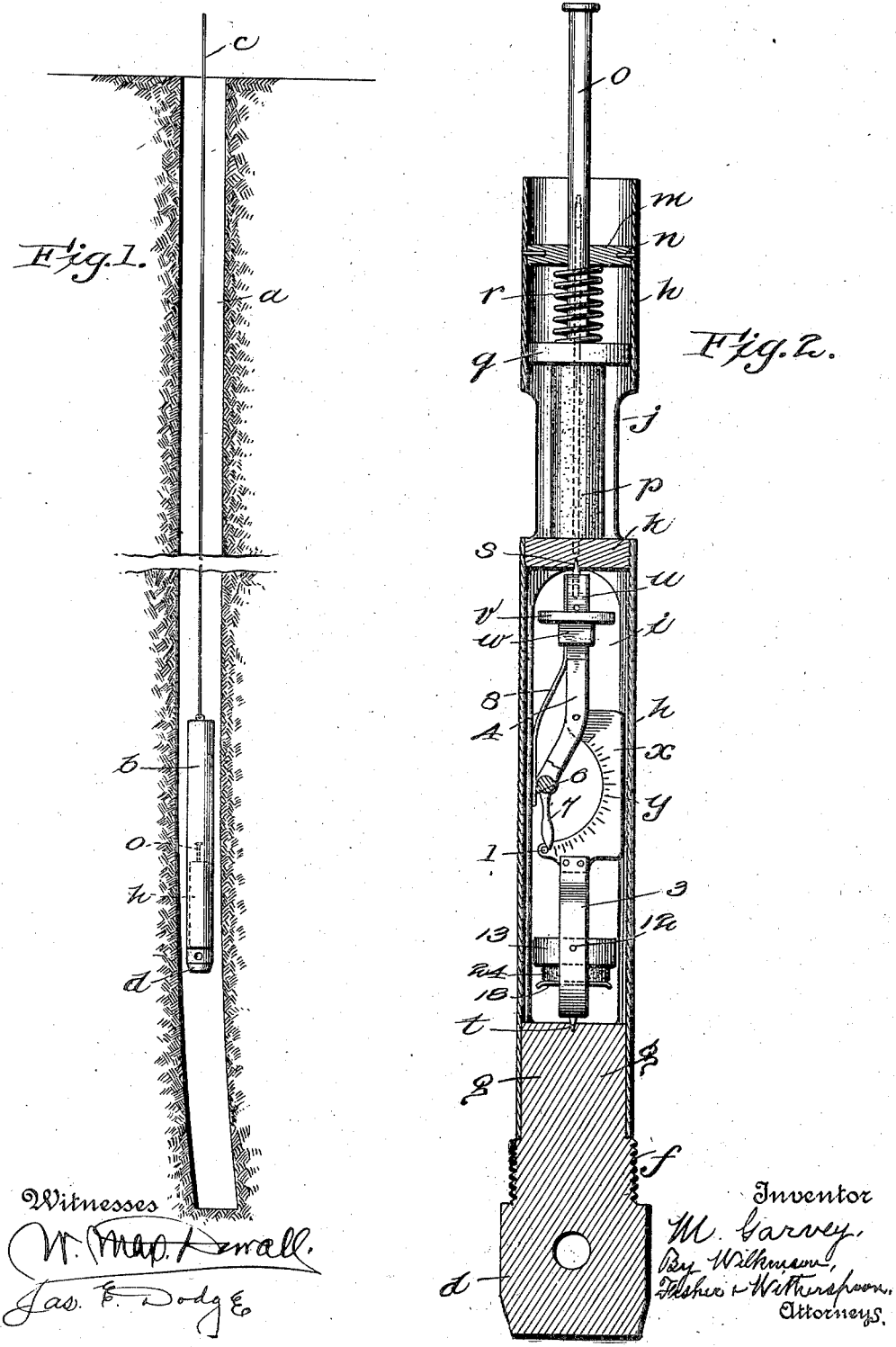

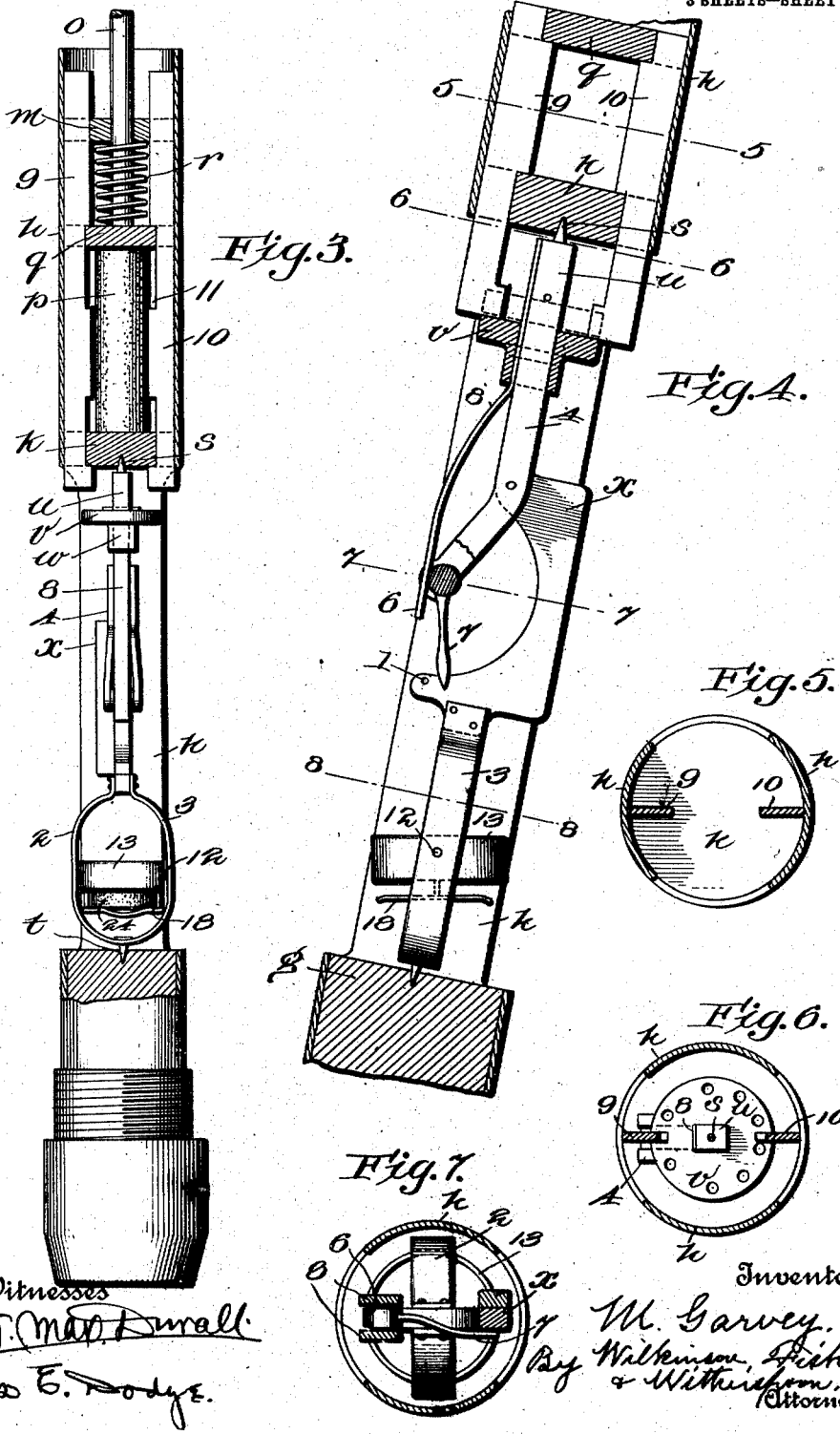

M. GARVEY.
APPARATUS FOR TESTING DRILL HOLES.
APPLICATION FILED APR. 23, 1909.
965,808.
Patented July 26, 1910.
3 SHEETS—SHEET 3.
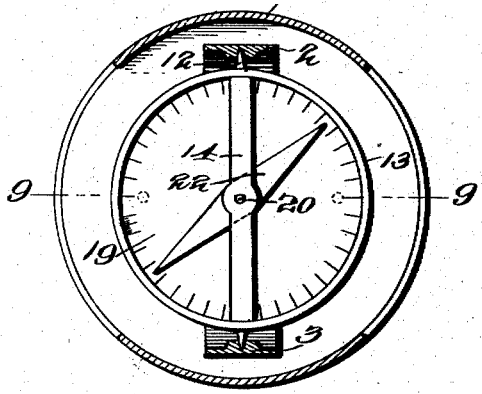
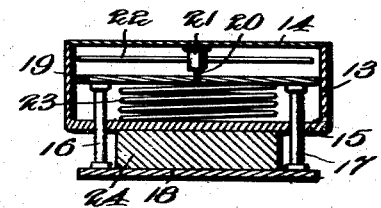
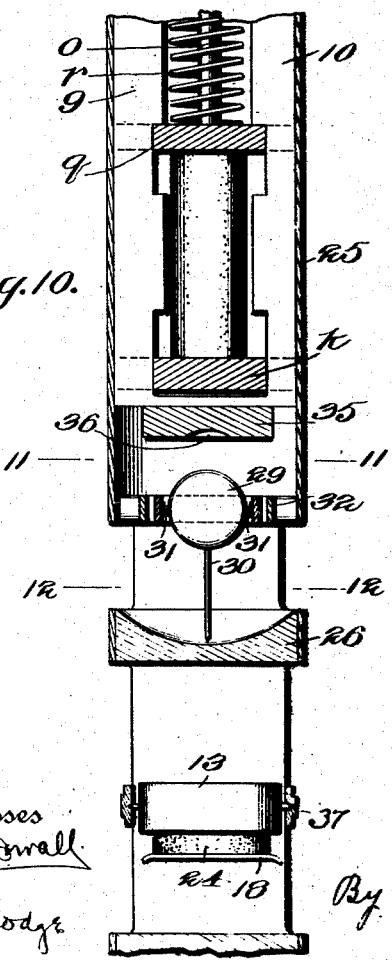
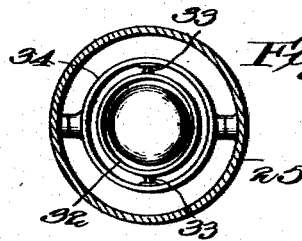
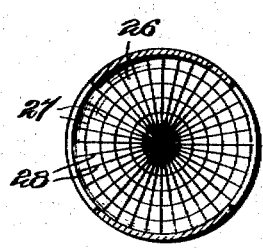

UNITED STATES PATENT OFFICE.

MATTHIAS GARVEY, OF MINEVILLE, NEW YORK.

APPARATUS FOR TESTING DRILL-HOLES.

965,808.  Specification of Letters Patent.  Patented July 26, 1910.

Application filed April 23, 1909. Serial No. 491,864.

*To all whom it may concern:*

Be it known that I, MATTHIAS GARVEY, a citizen of the United States, residing at Mineville, in the county of Essex and State of New York, have invented certain new and useful Improvements in Apparatus for Testing Drill-Holes; and I do hereby declare the following to be a full, clear, and exact description of the invention, such as will enable others skilled in the art to which it appertains to make and use the same.

My invention relates to apparatus for testing drill holes and is more especially intended for testing deep holes made by the use of diamond drills, although it is not restricted to such use.

It is well known that in drilling deep holes of small diameter, especially if such holes are started at an angle to the perpendicular, that these holes will, after a time, run off; that is to say, will incline away from the direction in which they were first started. It oftentimes becomes a matter of high importance to accurately test the inclination of these holes, especially in case of contiguous mining claims.

The object of my invention is to provide a simple apparatus and method by which the inclination of such drill holes may be readily and accurately tested by simply lowering said apparatus into the drill hole and allowing it to stay there a definite time, and with this object in view my invention consists in the method and in the construction and combinations of parts as hereinafter described and claimed.

In the accompanying drawings—Figure 1 represents a drill hole, the lower part of which is inclined from the perpendicular, and showing the testing apparatus suspended therein. Fig. 2 is a vertical cross section of the testing apparatus, the outer casing being removed. Fig. 3 is a cross section similar to Fig. 2, but taken on a plane at right angles thereto. Fig. 4 is a partial sectional view of the same apparatus, showing the position assumed thereby and by the indicating needle and compass after an inclined hole has been tested. Figs. 5, 6, 7, and 8 are cross sections on the lines 5—5, 6—6, 7—7, and 8—8, respectively, of Fig. 4, Fig. 8 being on a slightly larger scale. Fig. 9 is a vertical cross section on the line 9—9 of Fig. 8, but on a smaller scale. Fig. 10 is a vertical cross section of a part of a modified form of testing apparatus, and Figs. 11 and 12 are cross sections thereof taken on the lines 11—11 and 12—12 of Fig. 10.

Referring to Fig. 1, $a$ represents a drill hole and $b$ the casing of the testing apparatus, which is adapted to be let down into the hole by a wire $c$ and stopped at any desired point. In actual use, the testing apparatus is let down, for example, 100 feet, the inclination of the hole being there tested, and then this testing operation is repeated at every 100 feet down to the bottom of the hole.

Referring especially to Figs. 2, 3, and 4, the testing apparatus consists of a solid base $d$, preferably of brass and large enough to serve as a weight to carry the testing apparatus down, even if the hole is wholly or partially filled with water or oil. The base is cut away and provided with a screw-threaded portion $f$ and a still smaller plain portion $g$. The bottom of the case $b$ is also screw-threaded (not shown) and is adapted to engage the screw-threaded portion $f$. To the portion $g$ is firmly fixed a casing $h$, preferably made of brass or some material which will not readily rust, and which is provided with two sets of oppositely located cut away portions $i$ and $j$, these sets, however, being located at right angles to each other. The lower part of the casing $h$ is brazed, or firmly attached, to the part $g$ in any suitable manner. $k$ represents a partition located between these sets of perforations and firmly secured to the cylindrical casing $h$ by brazing or in any other suitable manner. $m$ represents another partition secured in the casing $h$ near its top by means of pins $n$, or in any other suitable manner, and provided with a central perforation for the passage of a movable pin $o$, with a number of perforations for the passage of water therethrough, and with two perforations for the passage of the slidable guide bars hereinafter described.

$p$ represents a cylinder of any material which will slowly dissolve in water, such as an ordinary stick of candy. On the lower end of the pin $o$ is firmly fastened a disk $q$, slotted so as to slide freely along the guide bars, and provided with a series of perforations through which water may pass for the purpose of attacking and dissolving the candy cylinder $p$.

$r$ represents a spring located between the partition m and the disk q, which tends to force said disk to its lowest possible position.

Below the partition k are located the devices for indicating the direction and inclination of the hole to be tested. They are mounted on two pivots s and t, engaging in holes in the partition k and base d, respectively. To the pin or pivot s is attached a part u, preferably made rectangular in cross section, and on this part is slidably mounted a plate v provided with holes for allowing water to pass freely therethrough, and having a rectangular extension w. The part u extends downwardly nearly to the central part of the casing, and to its lower end is attached a heavy connecting piece x, having a curved scale y thereon. At the lower end this connecting piece is provided with a retaining pin 1, which limits the movement of the indicating pointer, hereinafter described, in one direction. To the lower end of the piece x are attached two bars 2 and 3, which curve away from each other, as shown in Fig. 3, forming an oval, to the lower part of which the pin t is attached. Fastened in any suitable way to the lower end of the part u, are two bent arms 4. These arms are parallel with each other and in their lower ends is mounted a freely revoluble pin 6, to which is attached an indicating pointer 7.

8 represents a spring fastened to the part u, and which, when the disk v descends, is compressed by said disk, the lower end bearing against the pivot pin 6 and holding the pointer 7 in the position then assumed by it.

The downward movement of the disk v is accomplished as follows: 9 and 10 represent guide bars, the lower ends of which are adapted to engage the disk v, and which slide freely in slots provided for this purpose in the partitions k and m. These guide bars or plates are each cut away, as shown at 11, and when the disk q is forced down by the spring r a certain distance, it engages the shoulders formed on these bars, forcing them down and thereby forcing the disk v down, thus compressing the spring 8 and locking the pointer 7 in the position it happens to be in at that particular moment. This occurs whenever the stick of candy p is sufficiently dissolved so that it will give way, releasing the spring r.

Between the curved arms 2 and 3 is mounted a compass supported on pins such as 12, so that the compass as a whole can move freely between said arms. This compass is shown in detail in Figs. 8 and 9, and it consists of a cylindrical casing 13 closed by a glass plate 14 at the top, and provided with a bottom 15, which is perforated for the passage of the rods 16 and 17, which are attached to the movable plate 18 below the case 13, and also to a movable plate 19 within said case. Centrally mounted on the plate 19 is a pivot pin 20, having an enlarged top 21 and carrying a magnetic needle 22. A spring 23 is interposed between the bottom of the case and the plate, and 24 represents a disk of alum or other material, which slowly dissolves in water. It is evident from the construction described that as long as the disk 24 is undissolved, the compass and the needle therein will move freely in every direction, the magnetic needle will point to the pole and the compass case will assume a level position. As soon, however, as the disk 24 dissolves, the spring 23 presses the plate 19 upward, pressing the top 21 of the pivot pin against the glass and preventing any further movement of the magnetic needle 22.

The operation of this form of the device is as follows: The indicating means being in the position shown in Fig. 2 with the candy stick p and the disk 24 in position, the case b is filled with water and inverted and the indicating means dropped into it and screwed home. By means of the wire c, the case b and the parts contained therein are dropped down the hole the desired distance and the apparatus is allowed to stand, say for an hour. If the hole is inclined, the case b will of course occupy an inclined position and the pointer 7, not being acted on by the spring 8, will hang vertically, as indicated in Fig. 4. The magnetic needle will, at the same time, point north. As soon as the disk 24 has become dissolved by the water in the casing, the spring 23 will prevent the further rotation of the magnetic needle, and as soon as the stick p has been dissolved, the spring r will force down the disk q and the guide plates 9 and 10, forcing down the plate v, which thereby causes the spring 8 to strike the pin 6, thus confining the pointer in the position it has assumed. The apparatus is then drawn up, the case b taken off, and readings taken, the compass and the pointer 7 indicating the exact direction and inclination of the hole.

In Figs. 10 to 12, a modified form of the apparatus is shown, which is used when holes having a very slight inclination from the perpendicular are to be tested, the form shown in Figs. 1 to 9 being the one best adapted when holes originally driven in on an incline are tested. In this form the compass is mounted as before in the lower part of the indicating and registering apparatus, but is supported on pivots in a ring 37, and this ring 37 is supported on pivots in the casing 25, which corresponds to the casing h in the other form. The casing 25 is provided with a partition 26; this partition is hollowed out as shown in Fig. 10 and provided with a concentric scale 27 and a radial scale 28 as shown in Fig. 12, corresponding to and in line with that of the compass. Above this casing and centrally thereof, is mounted a ball 29, from the lower part of which an indicating needle 30 depends. This ball 29 is supported on pivots 31 in a ring 32, and this ring 32 is supported on pivots 33 in another ring 34, carried by the casing 25, the pivots 31 and 33 being at right angles to each other, as in an ordinary compass mounting, the effect being that the ball 29 is free to rotate in every direction, so that the needle 30 will always point directly downward. Above the ball 29 is mounted a sliding plate 35 provided with a depression 36 of a curvature corresponding to that of the ball 29. This disk 35 is adapted, when it falls, to press upon the ball 29 and lock it in the position it has then assumed. The plates, springs, and guide bars are similar to those already described. The operation of this form of device is precisely similar to that already described except that the needle 30 will, when the apparatus is inclined, swing out over the two scales 27 and 28, thereby indicating on one the deviation from the perpendicular and giving on the other the bearing, only when compared with the compass reading.

While I have thus described my invention, I wish it to be distinctly understood that I do not limit myself to the exact features shown and described, the main idea of the invention being the provision of an apparatus which in a tight casing can be let down into a drill hole, and which will automatically set itself according to the direction and degree of inclination of said hole and will then lock itself in such set position, whereupon it can be drawn up and read.

I claim:—

1. In an apparatus for testing drill holes, the combination of a casing closed at both ends, means for lowering said casing into a drill hole, freely movable indicating devices within said casing, soluble material and means for locking said indicating means in their set position at the end of a predetermined time, the operation of said locking means being prevented for a time by the soluble material within said casing, substantially as described.

2. In an apparatus for testing drill holes, the combination of a casing closed at both ends, means for lowering said casing into a drill hole, indicating devices within said casing for indicating the direction and degree of inclination of the drill hole, said indicating devices being freely movable, locking devices for locking said indicating means in the position assumed by them at the end of a predetermined time, and soluble material within said casing allowing, as it dissolves said locking means to lock said indicating means at the end of a predetermined time, substantially as described.

3. In an apparatus for testing drill holes, the combination of a casing, means for lowering said casing into a hole, a device within said casing for indicating the degree of inclination assumed by said casing after it has been lowered into the hole, said device being freely movable, means for locking said device in the position assumed by it under the action of gravity, and soluble material within said casing allowing, as it dissolves said locking means to act upon said indicating means after it has become dissolved, substantially as described.

4. In an apparatus for testing drill holes, the combination of a casing, means for lowering said casing into a hole, a device in said casing for indicating the direction of inclination of said hole, said device being freely movable under the action of magnetism and gravity, means for locking said device in its set position, and soluble material located between parts of the locking means, preventing said locking means from operating upon the indicating means until the lapse of a predetermined time, substantially as described.

5. In an apparatus for testing drill holes, the combination of a casing, means for lowering said casing into a hole, means for indicating the degree of inclination assumed by said casing, due to the inclination of the hole, means within said casing for indicating the direction of inclination, both of these indicating means being freely movable, devices for locking said indicating means in their set positions, and disks or rods of soluble material located between parts of the locking means preventing the operation of said locking means until a predetermined time, substantially as described.

6. In an apparatus for testing drill holes, the combination of a casing, means for lowering said casing into a hole, a compass freely mounted in said casing, a spring pressing against said compass tending to lock the needle of the compass against its casing, and a disk of soluble material between the casing and a part of the compass preventing, for a predetermined time, the action of said spring, substantially as described.

7. In an apparatus for testing drill holes, means for determining the direction of inclination of said hole, including a supporting casing and a compass pivotally mounted in said casing, said compass including an outside case, a movable plate, a magnetic needle pivotally mounted on said plate, a spring tending to move said plate against a part of said case, rods connected to said plate and passing through said case, a plate connected to the outer ends of said rods, and a disk of soluble material between said outer plate and the bottom of the case, whereby said compass will adjust itself freely under the influence of gravity and magnetism, and when said disk is dissolved will set the needle in the position last assumed by it, substantially as described.

8. In an apparatus for testing drill holes, the combination of a casing, means for lowering said casing into a drill hole, freely movable indicating means within said casing, including a pointer and a scale, means for locking said pointer in the position assumed by it under the action of gravity, and a stick of soluble material located between parts of the locking means preventing the operation of said locking means until the lapse of a predetermined time, substantially as described.

9. In an apparatus for testing drill holes, the combination of a casing, freely movable indicating means within said casing, including a movable pointer and a scale over which said pointer is adapted to move, means for locking said pointer at the lapse of a predetermined interval, devices for bringing into operation said locking means, and a mass of soluble material located between parts of the locking means preventing the action of said devices until the lapse of a predetermined period of time, substantially as described.

10. In an apparatus for testing drill holes, the combination of an inclosing casing, means for lowering said casing into a hole, freely movable indicating means within said casing, including a pointer and a scale over which said pointer is adapted to move, a spring operable when compressed to prevent the movement of said pointer, devices for compressing said spring against said pointer, spring-controlled means for operating said devices, and a mass of soluble material located between parts of said spring-controlled means and preventing the action of said spring-controlled means until the lapse of a predetermined interval, substantially as described.

11. In a device for testing drill holes, the combination of a casing, means for lowering said casing into a hole, freely movable indicating means within said casing, including a pointer and a scale over which said pointer is adapted to move under the influence of gravity, a spring which when compressed prevents the movement of said pointer, a slidable plate adapted to compress said spring and thereby lock said pointer, and means for moving said plate, including slidable guide arms, a disk adapted to move said arms, and a spring pressing against said disk, and a stick of soluble material located between said disk and a fixed part of the casing and preventing the movement of said last named disk until the lapse of a predetermined period of time, substantially as described.

12. In a device for testing drill holes, the combination of a casing, means for lowering said casing into a hole, freely movable indicating means within said casing, including a pointer and a scale over which said pointer is adapted to move under the influence of gravity, a spring which when compressed prevents the movement of said pointer, a slidable plate adapted to compress said spring and thereby lock said pointer, means for moving said plate, including slidable guide arms adapted to strike said plate, a disk adapted to strike against and move said arms, a spring pressing against said movable disk and against an immovable part of the casing, and a stick of candy located between said disk and an immovable part of the casing, substantially as described.

In testimony whereof, I affix my signature, in presence of two witnesses.

MATTHIAS GARVEY.

Witnesses:
 Don P. Walker,
 Joseph La Bier, Jr.